US010972433B2

(12) United States Patent
Verraes et al.

(10) Patent No.: US 10,972,433 B2
(45) Date of Patent: Apr. 6, 2021

(54) METHOD FOR THE MANAGEMENT AND MAINTENANCE OF AN AIRCRAFT COMPRISING A ZONE WITH A HIGH DEGREE OF SECURITY

(71) Applicant: SAFRAN ELECTRONICS & DEFENSE SAS, Boulogne Billancourt (FR)

(72) Inventors: Cédric Verraes, Boulogne Billancourt (FR); Emmanuel Couturier, Boulogne Billancourt (FR); Lionel Robin, Boulogne Billancourt (FR); Thomas Monot, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 190 days.

(21) Appl. No.: 16/087,819

(22) PCT Filed: Mar. 16, 2017

(86) PCT No.: PCT/EP2017/056311
§ 371 (c)(1),
(2) Date: Sep. 24, 2018

(87) PCT Pub. No.: WO2017/162526
PCT Pub. Date: Sep. 28, 2017

(65) Prior Publication Data
US 2019/0109825 A1  Apr. 11, 2019

(30) Foreign Application Priority Data
Mar. 25, 2016 (FR) ...................... 16/52600

(51) Int. Cl.
*H04L 29/06* (2006.01)
*H04L 29/08* (2006.01)
(Continued)

(52) U.S. Cl.
CPC ............ *H04L 63/0272* (2013.01); *B64F 5/40* (2017.01); *H04L 67/12* (2013.01); *H04L 67/38* (2013.01);
(Continued)

(58) Field of Classification Search
CPC ..... H04L 63/0272; H04L 67/12; H04L 67/38; B64F 5/40
See application file for complete search history.

(56) References Cited

U.S. PATENT DOCUMENTS

2009/0192659 A1   7/2009  Beebe et al.
2010/0198431 A1*  8/2010  Corbefin ............ G05B 23/0248
                                                        701/3
(Continued)

FOREIGN PATENT DOCUMENTS

FR       2 952 258 A1    5/2011
WO    2012/126674 A1    9/2012

OTHER PUBLICATIONS

Apr. 6, 2017 Search Report issued in International Patent Application No. PCT/EP2017/056311.

*Primary Examiner* — Anthony D Brown
*Assistant Examiner* — Rodman Alexander Mahmoudi
(74) *Attorney, Agent, or Firm* — Oliff PLC; R. Brian Drozd

(57) ABSTRACT

A method for the management and maintenance of an aircraft including a zone with a high degree of security, a man-machine interface of the aircraft being included in the zone with a high degree of security and necessary for a maintenance operation to be performed by a maintenance operator on a device of the aircraft to be maintained placed outside the zone with a high degree of security. The method includes: connection of a first device to the high-security zone; connection of a second device to a third device; reception of the first device by the second device of the
(Continued)

man-machine interface of the aircraft and transfer of information for display of the man-machine interface of the aircraft to the third device; and connection of the second device to a server by means of the telecommunication network in order to obtain information from the server intended for the third device.

6 Claims, 3 Drawing Sheets

(51) Int. Cl.
  *B64F 5/40* (2017.01)
  *G07C 5/00* (2006.01)
  *B64F 5/60* (2017.01)
  *G07C 5/08* (2006.01)

(52) U.S. Cl.
  CPC ............... *B64F 5/60* (2017.01); *G07C 5/008* (2013.01); *G07C 5/08* (2013.01); *H04L 63/08* (2013.01)

(56) References Cited

U.S. PATENT DOCUMENTS

| | | |
|---|---|---|
| 2011/0106366 A1 | 5/2011 | Ric et al. |
| 2014/0075507 A1* | 3/2014 | Robin et al. |
| 2017/0249355 A1* | 8/2017 | Kang ................. G06F 16/2425 |
| 2018/0120826 A1* | 5/2018 | Rhim ................. H04L 41/0866 |

* cited by examiner

METHOD FOR THE MANAGEMENT AND MAINTENANCE OF AN AIRCRAFT COMPRISING A ZONE WITH A HIGH DEGREE OF SECURITY

The present invention relates to the field of the management and maintenance of aircraft.

Maintenance of an aircraft sometimes requires, for the same maintenance operation, the presence of maintenance personnel in the cockpit of the aircraft as well as close to the part of the aircraft for which the maintenance operation must be performed.

For example, when maintenance operations must be performed on the front landing gear of an aircraft, at least two persons are necessary. A first person is placed in the cockpit of the aircraft and has access to documentation allowing maintenance of the front landing gear as well as to the various screens and/or controls in the cockpit.

These screens and/or controls are subsequently referred to as the man-machine interface of the cockpit.

The documentation is in paper form or stored in a computer system of the aircraft.

At least one second person physically carries out the maintenance on the front landing gear according to the instructions provided by the person placed in the cockpit of the aircraft.

These instructions are conventionally provided orally and are potentially interfered with by ambient noise.

Very often, the documentation is not up to date, which is detrimental to the maintenance of the aircraft.

In addition, the maintenance of an aircraft is liable to be provided by different persons from different companies throughout the world.

A maintenance operator follows an established maintenance procedure for arriving at determining what part replacement or adjustment must be carried out. It thus happens that the same part may be replaced several times by following the established procedure whereas this is not the cause of the fault but rather a consequence thereof.

Finally, depending on the place where the maintenance is carried out, it is sometimes difficult to involve a recognised expert for resolving such a failure.

The present invention aims to reduce the number of persons involved in certain maintenance tasks, to guarantee that the documentation necessary for a maintenance operation is up to date and to allow any intervention of an expert for a maintenance operation.

To this end, according to a first aspect, the invention proposes a method for the management and maintenance of an aircraft comprising a zone with a high degree of security, a man-machine interface of the aircraft being included in the zone with a high degree of security and necessary for a maintenance operation to be performed by a maintenance operator on a device of the aircraft to be maintained placed outside the zone with a high degree of security, characterised in that the method comprises the steps of:

connection of a first device to the high-security zone for accessing the man-machine interface of the aircraft, connection of a second device to a third device able to display the man-machine interface of the aircraft and by means of which the maintenance operator can interact with the man-machine interface of the aircraft, authentication of the maintenance operator with the second device, creation of a secure communication connection between the first and second devices, the secure connection being created in a communication network, reception of the first device by the second device of the man-machine interface of the aircraft and transfer of information for display of the man-machine interface of the aircraft on the third device, connection of the second device to a server by means of the telecommunication network in order to obtain information from the server intended for the third device by means of the second device, the connection of the second device to the server not being made by means of the secure connection created.

The invention also relates to a system for the management and maintenance of an aircraft comprising a zone with a high degree of security, a man-machine interface of the aircraft being included in the zone with a high degree of security and necessary for a maintenance operation to be performed by a maintenance operator on a device of the aircraft to be maintained placed outside the zone with a high degree of security, characterised in that the system comprises:

means of connection of a first device to the high-security zone for accessing the man-machine interface of the aircraft, means of connection of a second device to a third device able to display the man-machine interface of the aircraft and by means of which the maintenance operator can interact with the man-machine interface of the aircraft, means of authentication of the maintenance operator with the second device, means of creation of a secure communication connection between the first and second devices, the secure connection being created in a communication network, means of reception of the first device by the second device of the man-machine interface of the aircraft and transfer of information for display of the man-machine interface of the aircraft on the third device, means of connection of the second device to a server by means of the telecommunication network in order to obtain information from the server intended for the third device by means of the second device, the connection of the second device to the server not being made by means of the secure connection created.

Thus the present invention makes it possible to reduce the number of persons involved in certain maintenance tasks and to guarantee that the documentation necessary for a maintenance operation is up to date, and allows any involvement of an expert for a maintenance operation.

According to a particular embodiment of the invention, the information obtained from the server is the aircraft documentation.

Thus the maintenance operator has available all the documentation necessary for the maintenance operation.

According to a particular embodiment of the invention, the information obtained is a connection of an expert to the maintenance operator.

Thus the maintenance operator has available assistance from an expert for performing the maintenance operation.

According to a particular embodiment of the invention, the second device transfers the information for display of the man-machine interface of the aircraft to the server intended for the expert.

Thus the expert has available all the information necessary for assisting the maintenance operator.

According to a particular embodiment of the invention, the method further comprises the steps of:

creation of a secure communication connection between the first device and the server, the secure connection being created in the communication network, reception of the first device by the server of the man-machine interface of the aircraft for display of the man-machine interface of the aircraft to the server intended for the expert.

Thus the expert has available all the information necessary for assisting the maintenance operator.

The invention also relates to the computer programs stored on an information carrier, said programs comprising instructions for implementing the previously described methods, when they are loaded in and executed by a computer system.

The features of the invention mentioned above, as well as others, will emerge more clearly from a reading of the following description of an example embodiment, said description being given in relation to the accompanying drawings, among which:

Figure 1:
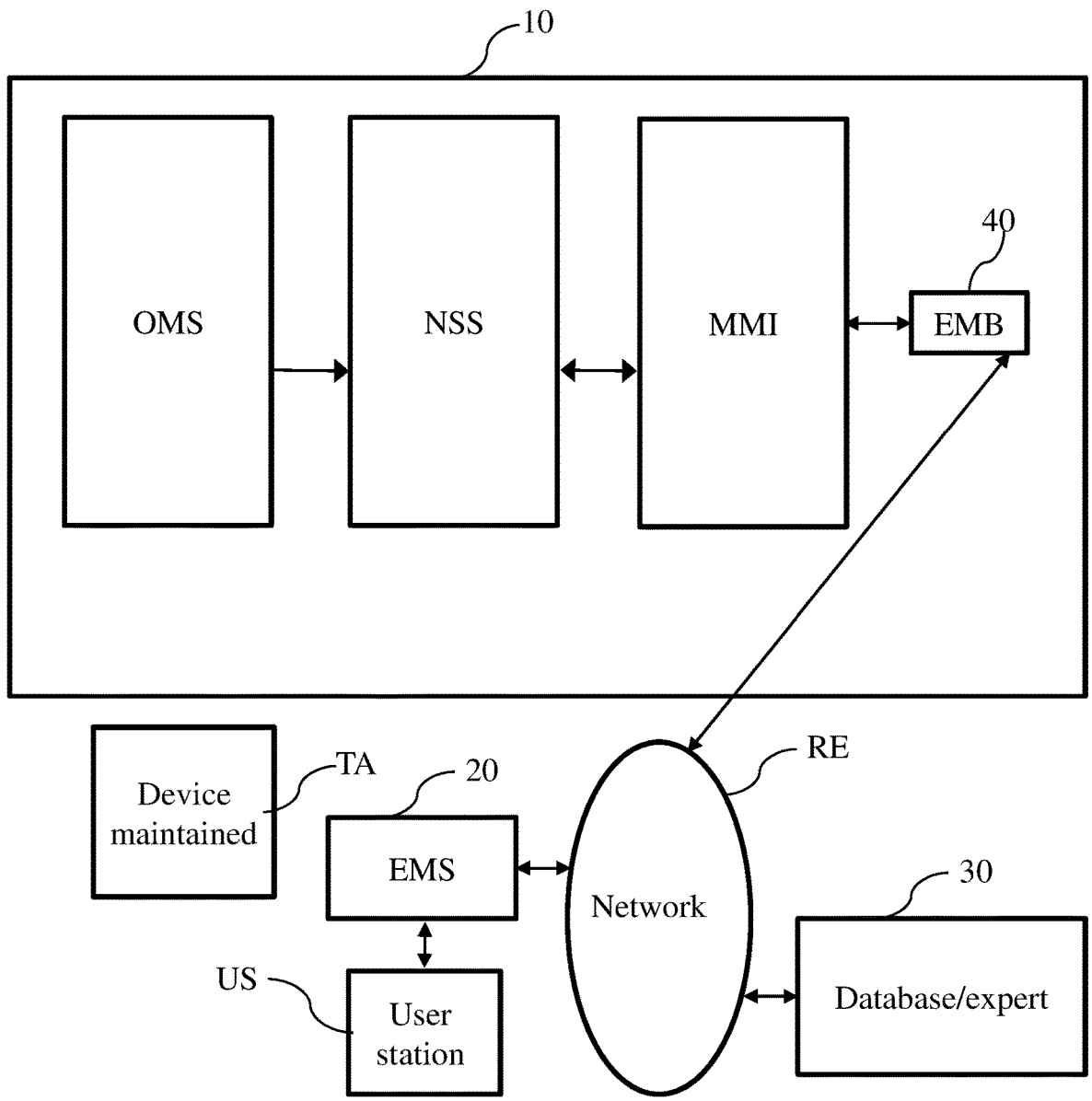
FIG. 1 shows a system in which the present invention is implemented.

In the aeronautical field, sensitive zones such as the cockpit OMS of an aircraft 10 are managed by a computer system requiring a high degree of security and therefore a high-security access control.

The information systems that manage such zones share high reliability and security needs and requirements. The security needs are characterised according to a plurality of themes, integrity, confidentiality, availability, reliability, anti-intrusion, and traceability of operations among other things. These systems comply with a strict specification aimed at ensuring this level of security.

In particular, it is said of a system, of an apparatus or even of a user that it is trusted if it does not present a security threat with regard to the security requirements of another system, in particular those having high reliability requirements for flight safety. On the other hand, a system or an apparatus able to act malevolently by impacting security requirements of another system is identified as being non-trusted.

High-security information systems, referred to as trusted, must therefore be protected from malevolent attacks coming from other systems that are non-trusted. During normal operation thereof, these systems are typically isolated, and their security level can therefore be guaranteed since it is not accessible to non-trusted elements.

However, these systems must undergo maintenance operations. These maintenance operations comprise the management of the system, change of parameters, updates, adaptations and adjustments. They also comprise the recovery of log data. Finally, they comprise the updating of software modules to enable the system to evolve. These maintenance operations require the connection of a system external to the OMS high-security system. This external system must then itself be trusted, that is to say be managed according to a precise specification consistent with the high-security system in order to guarantee trust of the maintenance operation.

According to the present invention, a first device, referred to as an onboard mobile device EMB 40, is connected to the sensitive zone OMS via a network server NSS and has access to the man-machine interface MMI of the aircraft.

A second device, referred to as a ground mobile device EMS 20, is in communication with the onboard mobile device EMB 40 by means of a network RE.

The ground mobile device EMS is connected to a third device, referred to as a user station US.

The trusted area includes the OMS, the aircraft 10, the onboard mobile device EMB 40 and the ground mobile device 20. The trusted area does not include the user station US.

Any type of user station US can be used for maintenance operations without requiring any particular management, since this does not form part of the trusted area. The user station US is for example a touch tablet, a smartphone or even a portable computer.

The connection between the onboard mobile device EMB 40 and the network server NNS can be made by a cabled connection such as an Ethernet connection or a wireless connection such as a Wi-Fi connection or the like.

Generally a firewall for limiting the data flows entering the sensitive zone OMS limits the outgoing data flows to the flows strictly necessary and provided for the maintenance of the system. The onboard mobile device EMB 40 is typically a portable computer that is connected to the network of the secure system. When the onboard mobile device EMB is not connected to the server of the network NSS by a direct cable link, for example when it is a wireless link or a link through a network, the connection between the onboard mobile device EMB and the network server NSS is protected by means of an encrypted tunnel.

The network RE is for example a wireless network such as a Wi-Fi network. The connection between the onboard mobile device EMB and the ground mobile device EMS 20 is protected by means of an encrypted tunnel.

The connection between the ground mobile device EMS 20 and the user station US may be based on any technology such as for example a serial link of the USB (universal serial bus) type or a cabled connection such as Ethernet or a wireless technology such as Bluetooth.

The ground mobile device EMS 20 also has means for authenticating the user, for example a fingerprint reader. The establishment of the tunnel with the onboard mobile device EMB 40 may be subject to authentication validation. The ground mobile device EMS 20 also has authentication credits available, for example in the form of digital certificates enabling said tunnel to be established.

The network RE also enables the ground mobile device EMS 20 to communicate with a remote server 30 hosting a database and making it possible to obtain assistance from an expert.

The server 30 is for example a server of the airline having available the aircraft 10, or a server of an aircraft maintenance company. The server 30 may be connected to the network RE by a combination of a plurality of communication networks, since it is very often physically very remote from the network RE.

When a maintenance operation must be performed by a maintenance operator on a device TA, for example a front landing gear, of the aircraft 10, the maintenance operator connects the onboard mobile device EMB 40 to the network server NSS. The onboard mobile device EMB 40 is for example stored in the aircraft 10 or is brought by the maintenance operator.

The maintenance operator goes close to the device to be maintained TA in order to perform maintenance thereof.

The maintenance operator connects the ground mobile device EMS 20 to the user station and authenticates himself with the ground mobile device EMS 20.

A tunnel is then created between the ground mobile device EMS 20 and the onboard mobile device EMB 40.

The man-machine interface MMI of the aircraft 10 is then offset on the user station US via the tunnel thus created and the ground mobile device EMS 20.

The man-machine interface MMI of the aircraft 10 allows the display of a maintenance menu making it possible to choose a maintenance operation type that comprises for example parameterising operations, the recovery of operational data and the updating of software modules in the system.

In addition, according to the present invention, the maintenance operator can access the server 30 by means of the ground mobile device EMS 20 in order to obtain technical documentation relating to the maintenance of the device TA. Likewise, the maintenance operator can access the server 30 by means of the ground mobile device EMS 20 in order to obtain technical assistance from an expert. Access to the technical documentation or to the assistance of an expert must be done in some cases via an encrypted tunnel so as to guarantee confidentiality of exchanges, for example during access to confidential parameterising elements of the TA.

The expert is a physical person or a software system assisting diagnosis that is more complete than the technical documentation relating to the maintenance of the device TA available either on the network server NSS or on a user station US.

Figure 2:
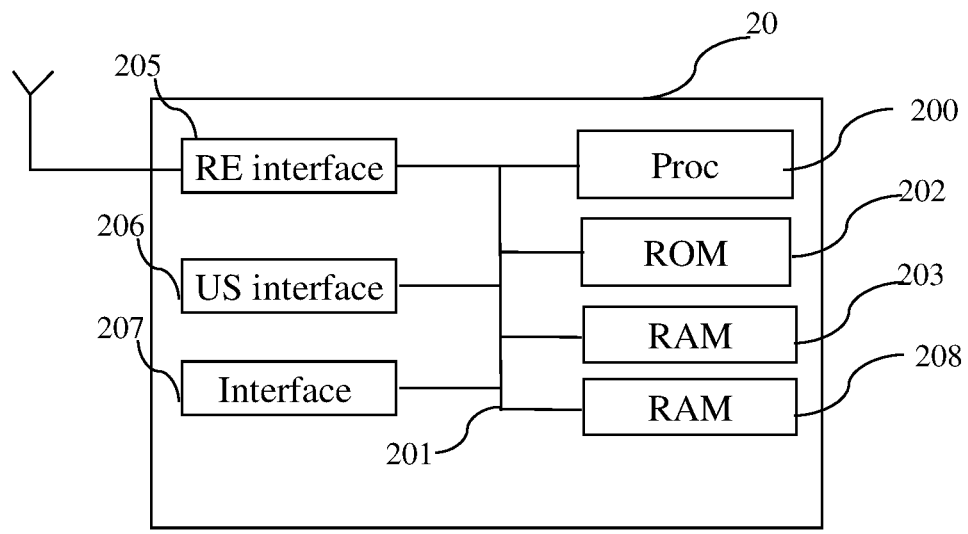
FIG. 2 shows an example of architecture of a ground mobile device according to the present invention.

FIG. 2 shows an example of architecture of a ground mobile device according to the present invention.

The ground mobile device EMS 20 comprises:
a processor, microprocessor or microcontroller 200;
a volatile memory 203;
a non-volatile memory 202;
a network interface 205;
an authentication interface 206;
an interface 207 for communication with a user station US;
a component 208, of the chip card type for example, making it possible to store data having high confidentiality requirements such as for example the elements allowing authentication;
a communication bus connecting the processor 200 to the ROM memory 203, to the RAM memory 203, to the component 208 and to the interfaces 205, 206 and 207.

The processor 200 is capable of executing instructions loaded into the volatile memory 203 from the non-volatile memory 202. When the ground mobile device EMS 20 is powered up, the processor 200 is capable of reading instructions from the volatile memory 203 and executing them. These instructions form a computer program that causes the implementation, by the processor 200, of all or part of the method described in relation to FIG. 4.

Figure 4:
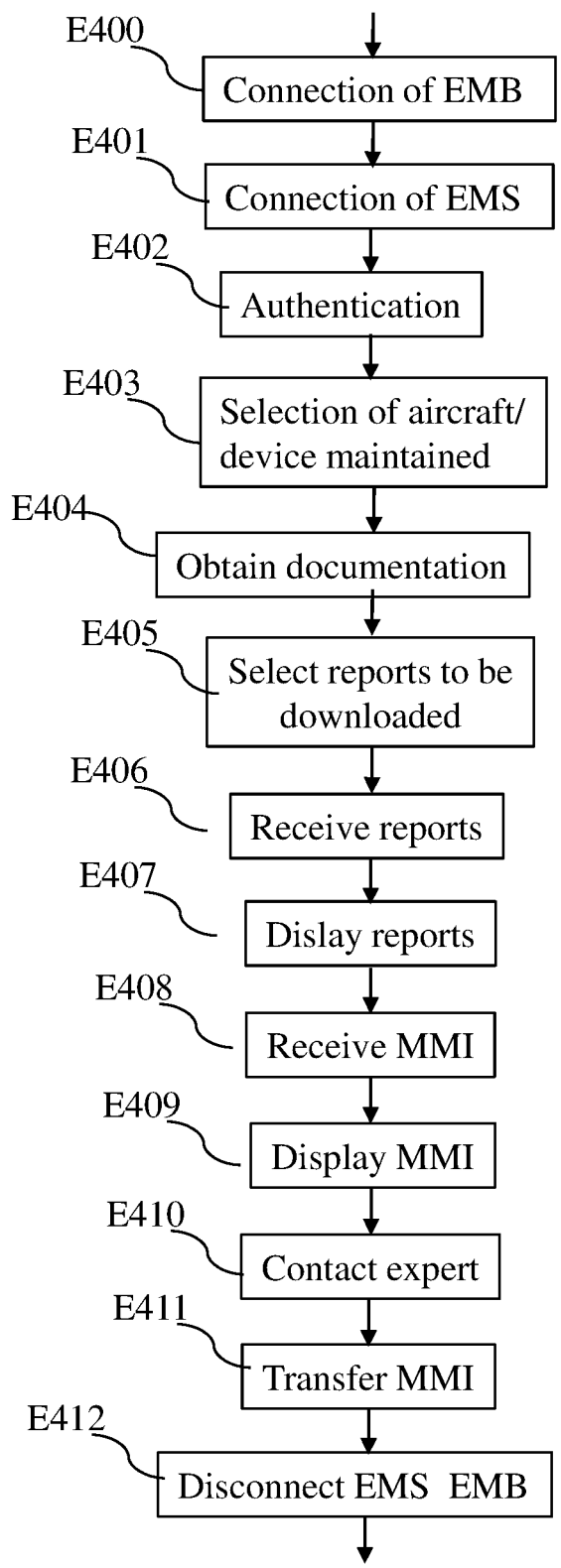
FIG. 4 shows steps of an algorithm partly executed by a ground mobile device.

All or part of the method described in relation to FIG. 4 can be implemented in software form by the execution of a set of instructions by a programmable machine, such as a DSP (digital signal processor) or a microcontroller or be implemented in hardware form by a machine or a dedicated component, such as an FPGA (field-programmable gate array) or an ASIC (application-specific integrated circuit).

Figure 3:
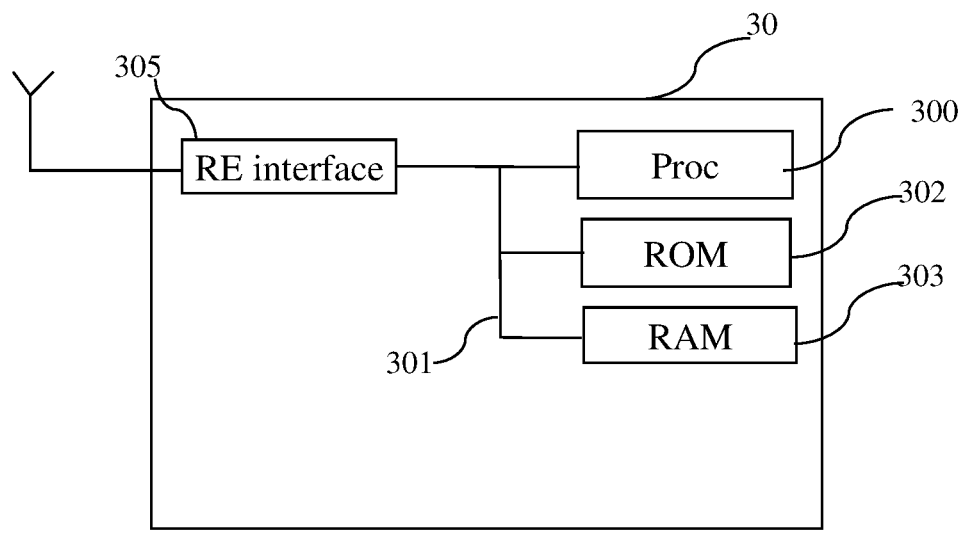
FIG. 3 shows an example of architecture of a server according to the present invention.

FIG. 3 shows an example of architecture of a server according to the present invention.

The server 30 comprises:
a processor, microprocessor or microcontroller 300;
a volatile memory 303;
a non-volatile memory 302;
a network interface 305;
a communication bus connecting the processor 300 to the ROM memory 303, to the RAM memory 303 and to the network interface 305.

The processor 300 is capable of executing instructions loaded into the volatile memory 303 from the non-volatile memory 302. When the server 30 is powered up, the processor 300 is capable of reading instructions from the volatile memory 303 and executing them. These instructions form a computer program that causes the implementation, by the processor 300, of all or part of the method according to the present invention.

All or part of the method according to the present invention can be implemented in software form by the execution of a set of instructions by a programmable machine, such as a DSP (digital signal processor) or a microcontroller or be implemented in hardware form by a machine or a dedicated component, such as an FPGA (field-programmable gate array) or an ASIC (application-specific integrated circuit).

FIG. 4 shows steps of an algorithm partly executed by a ground mobile device.

At step E400, the maintenance operator connects the onboard mobile device EMB 40 to the sensitive zone OMS via the network server NSS, which thus among other things gives access to the man-machine interface MMI of the aircraft.

At step E401, the maintenance operator places himself at the device to be maintained TA and connects the ground mobile device EMS 20 to the user station US.

At step E402, the maintenance operator authenticates himself with the ground mobile device EMS 20. The authentication is for example done by means of a code or entering the fingerprint of the maintenance operator. Once this operation has been performed, the ground mobile device EMS 20 establishes a tunnel with the onboard mobile device EMB 40 by means of the network RE. The ground mobile device EMS 20 can thus obtain a representation of the man-machine interface MMI of the aircraft.

At step E403, the maintenance operator selects, with the user station US, the type of aircraft to be maintained and/or the type of device to be maintained.

At the following step E404, the technical documentation of the aircraft is obtained by the ground mobile device EMS 20 and transferred to the user station US.

The technical documentation of the aircraft can be obtained from two sources: from the server of the network NNS by means of the tunnel and the onboard mobile device EMB, or according to the present invention from the server 30. The ground mobile device EMS 20 then makes a request to the server 30 via the network RE in order to obtain it and receives it in response.

At step E404, the operator if necessary selects the report or reports to be downloaded. These reports are for example reports comprising data stored during the flight of the aircraft. The information representing the selection is recovered by the ground mobile device EMS 20, which makes requests accordingly to the onboard mobile device EMB 40 by means of the previously created tunnel.

At step E405, the reports corresponding to the selection are received by the ground mobile device EMS 20.

At step E406, the ground mobile device EMS 20 transfers the reports received to the user station US.

At step E407, the ground mobile device EMS 20 obtains from the onboard mobile device EMB 40 the man-machine interface MMI of the aircraft. The man-machine interface MMI of the aircraft is transferred by the onboard mobile device EMB 40 in the previously created tunnel.

At step E407, the ground mobile device EMS 20 transfers the man-machine interface MMI of the aircraft for display thereof on the screen of the user station US. The maintenance operator can thus carry out the maintenance on the device to be maintained TA and can make various adjustments from the information supplied by the man-machine interface of the aircraft without needing any assistance from a third party in the aircraft cockpit.

Some maintenance operations may prove to be complex and the maintenance operator may sometimes need assistance from an expert.

The maintenance operators and/or the airlines have persons specialising in given maintenance operations. These specialists or experts are not necessarily based at the maintenance site.

The present invention thus offers the possibility for the maintenance operator to contact an expert to assist him in the operation of maintaining the device to be maintained.

At step E409, the ground mobile device EMS 20 detects a request to contact an expert. The contact request is made by the maintenance operator by means of the user station and received by the ground mobile device EMS 20. At this step, the ground mobile device EMS 20 transfers a request to contact an expert to the server 30.

At step E410, the man-machine interface of the aircraft is transferred to the server 30 for display thereof to the expert.

For example, the man-machine interface is transferred by the ground mobile device for display thereof to the expert.

In a variant, the server 30 establishes a tunnel with the onboard mobile device EMB 40 by means of the network RE and obtains from the onboard mobile device EMB 40 the man-machine interface MMI of the aircraft. The man-machine interface MMI of the aircraft is transferred by the onboard mobile device EMB 40 in the tunnel created.

The expert and the maintenance operator thus have available information necessary for the maintenance of the aircraft.

At step E412, the maintenance operator disconnects the user station US from the ground maintenance device EMS 20, and goes into the aircraft cockpit to disconnect the onboard maintenance device from the network server NSS.

The invention claimed is:

1. A method for the management and maintenance of an aircraft comprising a zone with a high degree of security, a man-machine interface of the aircraft being included in the zone with a high degree of security and necessary for a maintenance operation to be performed by a maintenance operator on a device of the aircraft to be maintained placed outside the zone with a high degree of security, wherein the method comprises the steps of:
    connection of a first device to the high-security zone for accessing the man-machine interface of the aircraft,
    connection of a second device to a third device able to display the man-machine interface of the aircraft and by means of which the maintenance operator can interact with the man-machine interface of the aircraft, the second and third device being located outside the zone with a high degree of security,
    authentication of the maintenance operator with the second device,
    creation of a secure communication connection between the first and second devices, the secure connection being created in a communication network by means of an encrypted tunnel, providing a trusted area that includes the aircraft, the first device, the second device and excluding the third device,
    reception from the first device by the second device of the man-machine interface of the aircraft and transfer of information for display of the man-machine interface of the aircraft on the third device,
    connection of the second device to a server by means of the telecommunication network in order to obtain information from the server intended for the third device by means of the second device, the connection of the second device to the server not being made by means of the secure connection created.

2. The method according to claim 1, wherein the information obtained from the server is the aircraft documentation.

3. The method according to claim 1, wherein the information obtained is a connection of an expert with the maintenance operator.

4. The method according to claim 3, wherein the second device transfers the information for display of the man-machine interface of the aircraft to the server intended for the expert.

5. The method according to claim 3, wherein the method further comprises the steps of:
    creation of a secure communication connection between the first device and the server, the secure connection being created in the communication network,
    reception of the first device by the server of the man-machine interface of the aircraft for display of the man-machine interface of the aircraft to the server intended for the expert.

6. A system for the management and maintenance of an aircraft comprising a zone with a high degree of security, a man-machine interface of the aircraft being included in the zone with a high degree of security and necessary for a maintenance operation to be performed by a maintenance operator on a device of the aircraft to be maintained placed outside the zone with a high degree of security wherein the system comprises circuitry causing the device to perform:
    connection of a first device to the high-security zone for accessing the man-machine interface of the aircraft,
    connection of a second device to a third device able to display the man-machine interface of the aircraft and by means of which the maintenance operator can interact with the man-machine interface of the aircraft, the second and third device being located outside the zone with a high degree of security,
    authentication of the maintenance operator with the second device,
    creation of a secure communication connection between the first and second devices, the secure connection being created in a communication network by means of an encrypted tunnel providing a trusted area that includes the aircraft, the first device, the second device and excluding the third device,
    reception from the first device by the second device of the man-machine interface of the aircraft and transfer of information for display of the man-machine interface of the aircraft on the third device,
    connection of the second device to a server by means of the telecommunication network in order to obtain information from the server intended for the third device by means of the second device, the connection of the second device to the server not being made by means of the secure connection created.

* * * * *